(12) United States Patent
Gougeon et al.

(10) Patent No.: US 7,254,706 B2
(45) Date of Patent: Aug. 7, 2007

(54) SYSTEM AND METHOD FOR DOWNLOADING OF FILES TO A SECURE TERMINAL

(75) Inventors: Dominique Gougeon, Rocklin, CA (US); Serge Le Crom, La Terrasse (FR); John F. Sheets, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1240 days.

(21) Appl. No.: 09/893,465

(22) Filed: Jun. 29, 2001

(65) Prior Publication Data

US 2003/0005289 A1   Jan. 2, 2003

(51) Int. Cl.
*H04L 29/00* (2006.01)
(52) U.S. Cl. ........................ 713/156; 713/193
(58) Field of Classification Search ................ 713/201, 713/175, 180, 156, 193; 705/72
See application file for complete search history.

(56) References Cited

U.S. PATENT DOCUMENTS

| | | | | |
|---|---|---|---|---|
| 5,578,808 A | * | 11/1996 | Taylor | 235/380 |
| 5,659,616 A | * | 8/1997 | Sudia | 705/76 |
| 5,721,781 A | * | 2/1998 | Deo et al. | 705/67 |
| 6,091,835 A | * | 7/2000 | Smithies et al. | 382/115 |
| 6,092,202 A | * | 7/2000 | Veil et al. | 713/201 |

OTHER PUBLICATIONS

When a password is not a password, Kenneth P Weiss, 1990.*

* cited by examiner

*Primary Examiner*—Kambiz Zand
*Assistant Examiner*—Andrew L Nalven

(57) ABSTRACT

Protection of private keys used to digitally sign files to be downloaded to a terminal is accomplished by storing the private keys in smartcards, and arranging a secure processor unit embedded in the smartcard to perform all signing operations requiring access to the keys so that the keys never leave the card. In addition, access to the signing operations is protected by multiple PINs, which may be distributed to multiple individuals and/or used to establish different signing authorization levels associated with different types of files.

13 Claims, 2 Drawing Sheets

SYSTEM AND METHOD FOR DOWNLOADING OF FILES TO A SECURE TERMINAL

BACKGROUND OF THE INVENTION

1. Field of the Invention

The invention relates to downloading of files into secure input terminals, i.e., terminals which enable a customer to input information, and which process and transmit the information to an external computer for verification. The information processed by the terminal may include credit or debit card data read by a magnetic stripe reader, personal identification numbers (PINs) manually input through a keypad, biometric data such as fingerprints, and so forth. The files downloaded to the terminal may be application programs, encryption keys or certificates, or other programs for enabling the terminal to carry out data input, processing, and communications functions.

More particularly, the system and method of the invention relates to safeguarding the encryption keys used to digitally sign, and thereby authenticate, files to be downloaded into the terminal, by using a smartcard to prevent the signer from gaining access to the keys, and by using one or more PINs to limit access to smartcard functions.

In a preferred embodiment of the invention, each file to be downloaded to the terminal is signed by the "private key" of a public-private key cryptosystem. The private key is stored in the memory of the smartcard, and is only accessible, upon entry of one or more PINs, through an embedded processor that performs all signing operations requiring access to the private key. A signer certificate containing the corresponding public key is also stored on the smartcard and appended to the file during the digital signing operation, and the signed file is downloaded together with the signer certificate to a terminal, after which the digital signature is authenticated by the terminal using the certificate. In addition, the signer certificate is authenticated by a higher level public key certificate resident in the terminal.

The method and system of the invention thus protects the private key used to sign the files (i) by employing PINs to limit access to the signing procedure, and (ii) by ensuring that the entity that signs the files never has access to the private key. The use of a smart card prevents duplication of the private key, while the use of multiple PINs enables smartcard access to be limited to multiple individuals working in concert, and/or enables establishment of multiple access levels so that less trusted individuals can be limited to certain types of file downloads.

2. Description of Related Art

Systems and methods for authenticating files to be downloaded to terminals, and in particular to point-of-sale or user identification terminals, are well-known. Such authentication is in general required in any terminals designed to handle sensitive information such as credit or debit card numbers, PINs associated with the credit or debit cards, and security codes, passwords, or biometric information. Given the pervasiveness of such terminals, the interconnectivity of the terminals, and the value of the data involved, the loading of single rogue program designed to misappropriate data within the terminal, or to use the terminal as a means for accessing computers and databases connected to the terminal, could have catastrophic consequences.

The problem of unauthorized or rogue software can of course be entirely prevented by simply pre-installing all necessary software and files, and subsequently preventing loading of any program into a terminal after installation at a point-of-sale or other location. However, this would effectively prevent owners of the terminals from customizing or updating the software that controls the terminals, necessitating replacement of the entire terminal whenever changes needed to be made. As a result, it is highly desirable, despite the potential risk, to permit loading of software into terminals following installation.

The most effective way to prevent unauthorized loading of files into a terminal is through file authentication, and in particular through use of digital signing and certification techniques, which involve signing of the files to be loaded using a secret key, and decrypting the resulting digital signature to determine if it in fact was encrypted by the secret key. The secret key in question can either be a shared secret key, in which case decryption must be carried out by a key previously loaded into the terminal, or a private key, in which case decryption may be carried out by a public key, conventionally provided in the form of a "signer's certificate," that can either be pre-installed in the receiving terminal or appended to the digitally signed file. The signer's public key certificate conveniently may contain not only the public key, but also information necessary to use the public key to decrypt a file, and optional additional information such as limitations or instructions on use of the attached file. If the signer's public key certificate is not already pre-installed in the terminal, it needs to be digitally signed and authenticated by an additional public key certificate, referred to herein as an "owner" or "sponsor" certificate, but this does not detract from the portability of the signer certificate. Private key encryption is much more versatile than shared secret key encryption because an unlimited number of different private keys can be used without having to pre-load a corresponding number of keys in the terminal.

A potential weakness of such an authentication system lies in protection of the private key used to sign the files. Currently, private keys and corresponding signer certificates are supplied to the signer on disks or via secured communications, and protected during transit by encryption using a password or PIN sent separately to the signer. When a digital signature is required, the PIN is entered and verified, and the private key is decrypted and accessed by a computing device which performs the computations necessary to generate the digital signature. As a result, the private key is vulnerable to duplication during the signing procedure. This may occur because the legitimate holder of the PIN that permits decryption of the key is untrustworthy, or because the PIN has been stolen.

The conventional approach to the problem of key security during signing is to establish strict security procedures at the location where signing takes place, including background investigations of personnel, and limitations on access to equipment and PINs. Nevertheless, as repeated cases of security breaches in the FBI and even the CIA have demonstrated, it is essentially impossible to ensure either the trustworthiness of personnel or the following of security procedures. While use of PINs is desirable to limit access to the signing process, it is not a complete solution to the problem. Instead, the only way to completely ensure that the signer, or an agent or employee of the signer, cannot copy a private key is to ensure that the signer never has access to the private key.

As a result, the present invention takes a two-pronged approach to the problem of protecting private keys during signing. The first prong involving improved PIN security through the use of multiple PINs, and the second prong involving limiting damage in case PIN security is nevertheless breached by preventing access to the private key even during the signing process.

SUMMARY OF THE INVENTION

It is accordingly a first objective of the invention to provide a system and method for increasing security of input terminals that receive, process, and communicate sensitive information by preventing fraudulent or malicious downloading of files, including application programs and certificates, to the terminals.

It is a second objective of the invention to provide a system and method of protecting the keys used to digitally sign, and thereby authenticate, files for downloading to terminals by limiting use of the keys to multiple individuals acting in concert, or by limiting the types of files that can be associated with a particular digital signature.

It is a third objective of the invention to prevent misuse of a digital signature process by preventing initiation of the process even if a PIN protecting the key is compromised or the signer is untrustworthy.

It is a fourth objective of the invention to protect a private key used to digitally sign, and thereby authenticate, files for downloading to the terminal by preventing the private key from being duplicated even if all PINs and other measures for protecting the key are compromised.

These objectives are accomplished, in accordance with the principles of the invention, by using a smartcard to secure a private key during generation of a digital signature for the purpose of enabling authentication of signed files to be downloaded to a terminal, and in particular by limiting access to the private key to a secure processor unit embedded in the smartcard so that the private key never leaves the card. In addition, the objectives of the invention are accomplished by providing for the establishment of multiple PINs to protect the smartcard from misuse.

The objectives of the invention are further achieved, in accordance with the principles of a first preferred embodiment of the invention, by providing a system for downloading files to a terminal that includes one or more of the following elements:

a certification authority/smartcard management system that issues smartcards containing a signer certificate, a private key for generating digital signatures, an authorization level for specifying a number of PINs to be entered through a file signing tool in order to access a respective smartcard, a corresponding PIN or PINs, and an embedded secured processor capable of performing all digital signing operations that require access to the private key;

a customer file signing tool including a smartcard reader arranged to digital sign a file upon input by the user of one or more PINs corresponding to the PIN or PINs on the smart card, the smartcard performing all operations that require access to the private key before supplying the results of the operations to the customer file signing tool, the file signing tool then performing further processing as necessary to generate a digital signature that can be appended to the file together with the signer certificate and downloaded to a terminal;

a terminal to which the signed file is to be downloaded, the terminal including a means for verifying the digital signature according to the signer certificate, and a higher level "owner" or "sponsor" certificate for authenticating the signer certificate.

In addition, the objectives of the invention are achieved, in accordance with the principles of the first preferred embodiment of the invention, by providing a method of downloading files to a terminal that includes one or more of the following steps:

I. Certification
  a. Receiving a request for a certificate;
  b. Collecting information about the requester if the requester is a new customer or authenticating the requester if the requester is an existing customer;
  c. Programming a secure processing unit embedded in a smartcard to include a private key, algorithms for performing digital signature generating operations using the private key, a signer certificate containing a public key associated with the private key and other information related to generation or use of the digital signature, an authorization level that indicates a number of PINs to be entered through, and processed by, a file signing tool in order to access the smartcard, and a corresponding PIN or PINs;
  d. Separately supplying the smartcard, and PINs corresponding to the PINs stored on the smartcard, to the customer;

II. Signing
  a. Inserting the smartcard in a reader connected to a computing device on which the customer file signing tool has been installed;
  b. Inputting at least one PIN to the customer file signing tool and, if more than one PIN is required, processing the input PINs to obtain a combined PIN corresponding to a PIN stored on the smartcard;
  c. Supplying a file to the customer file signing tool;
  d. After verifying the input PIN or PINs, generating a digital signature by processing data related to the file using the customer file signing tool, the customer file signing tool supplying and receiving data from the smartcard as necessary to enable the secure processor unit on the smartcard to perform all operations that require access to the private key;
  e. Retrieving the signer certificate from the smartcard and appending the signer certificate to the digitally signed file.

III. Authentication
  a. Downloading the digitally signed file to a terminal, with the appended signer certificate;
  b. Authenticating the digitally signed file using the signer certificate;
  c. Authenticating the signer certificate using a previously stored owner or sponsor certificate.

While the system and method of the invention may be used with any terminal capable of receiving and authenticating downloaded files, the invention is especially suitable for use in connection with input terminals having multiple data storage partitions that provide for different levels of certification. In an especially advantageous arrangement of partitions and certificates, the certificates form a certificate tree that permits different levels of authentication for different types of files and sponsors or owners.

On the other hand, it will be appreciated that the system and method of the invention are not to be limited to a particular terminal arrangement or authentication procedure, and that these aspects of the preferred embodiment may be varied by those skilled in the art. Instead, as indicated above, the invention is primarily concerned with protection of the keys used during the signing procedure, and not with the signing procedure or hardware per se, or the subsequent authentication.

DETAILED DESCRIPTION OF THE PREFERRED EMBODIMENTS

The present invention addresses the problem of protecting private keys used to sign files to be downloaded to a terminal in two ways:

I. the invention provides a way to limit use of the private keys to holders of multiple PINs, or to multiple PIN holders, thereby decreasing the likelihood that a single negligent or rogue individual could compromise security and, II. the invention prevents duplication of the private keys by having a secure processor embedded in a smartcard perform all operations requiring access to the private keys.

Figure 1:
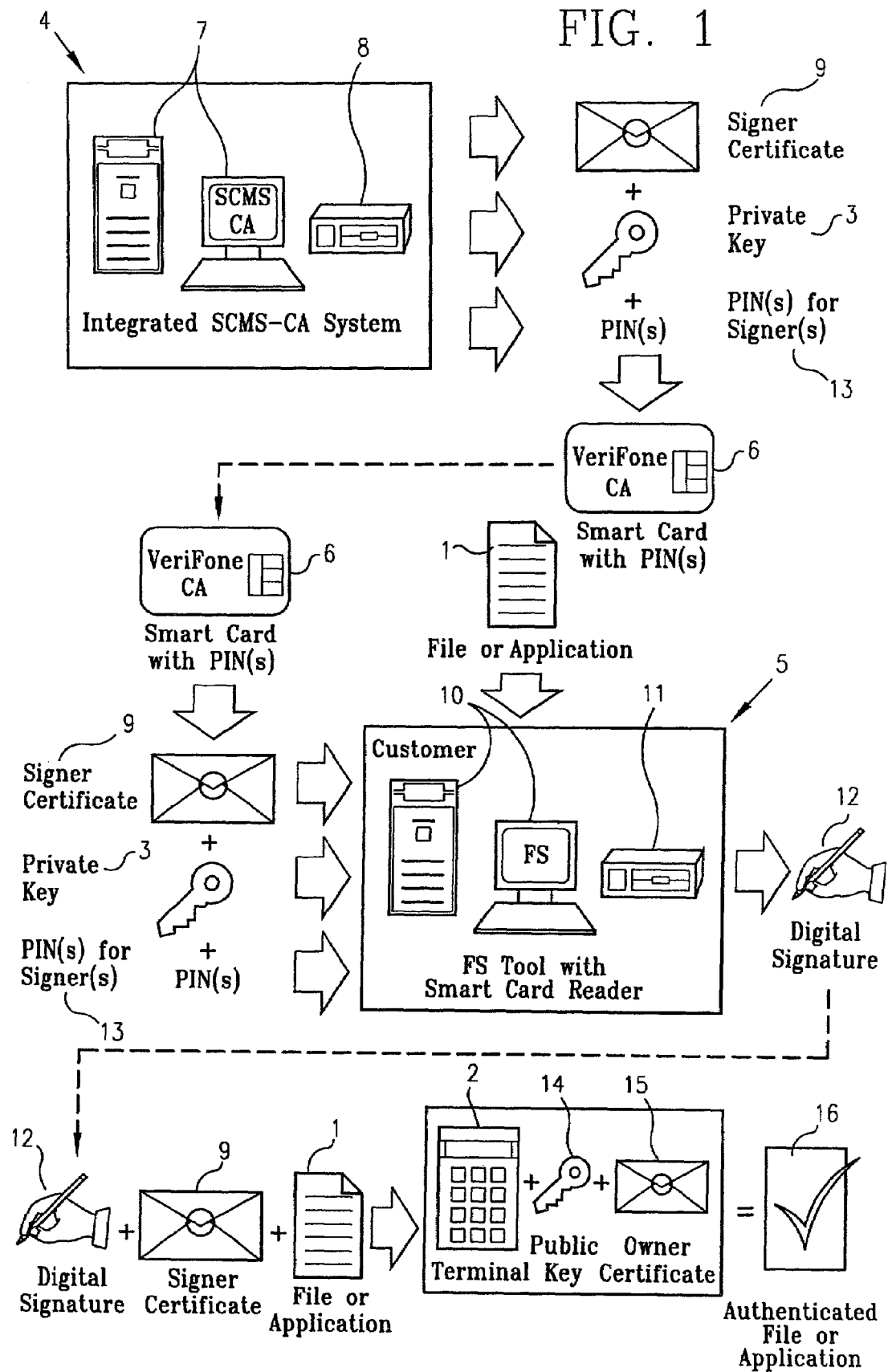
FIG. 1 is a schematic diagram of a key management and file authentication system for securing the downloading of files to a terminal that includes, according to the principles of a preferred embodiment of the invention, a signer smart card and multiple PINs.

Referring to FIG. 1, the ultimate objective of the invention is, as indicated above, to prevent malicious or fraudulent loading of files 1 into a terminal 2, by protecting the private key or keys 3 used to sign the files. Accomplishment of this objective involves two entities, known as the certification authority/smartcard management system 4 and the file signing tool 5. Although the following description of the preferred embodiment sets forth in detail the manner in which the digitally signed files are authenticated, it will be appreciated that the present invention relates primarily to key protection, and that details of the file authentication procedure (except insofar as key protection is involved), and the manner in which the files are downloaded to and authenticated by terminal 2, are not part of the present invention and therefore may be freely varied without departing from the scope of the invention. Furthermore, it should be understood that the multiple PIN aspect of the invention (described in detail below) is subsidiary to the smartcard aspect, i.e., the private-key-protecting smartcard may be used without protecting it by multiple PINs.

In order to accomplish its objective of protecting private keys, smartcard 6 is arranged to store a private key in such a manner that the private key can only be accessed by a secure processor embedded in the smartcard, which requires programming of the secure processor so that it performs all digital signing operations that require access to the stored private key. Once programmed in this manner, there is no need for the private key to leave the card, and therefore protection of the private key essentially becomes a matter of physical tamper prevention.

In some circumstances, the illustrated arrangement of smartcard 6 may be varied by omitting PIN protection, so long as access to the private key is prevented for example in situations where the smartcard is to be used by the terminal manufacturer to load files during software development.

In addition, it is also possible, within the scope of the invention, to vary the illustrated arrangement of the smartcard by conveying the signer certificate to the terminal by a channel separate from the illustrated channel, eliminating the need to store the signer certificate on the smartcard, for example by sending the signer certificate to the file signing tool, or directly to the terminal, via an alternative medium such as a magnetic disk or network, although storage of the signer certificate on the smartcard and retrieval of the signer certificate by the file signing tool 5, described in more detail below, appears to be the most convenient way of transferring the signer certificate to the terminal.

Tamper-proof smartcards that include a secure processor and the capability of storing information in a manner that ensures that the stored information can only be accessed by the secure processor are commercially available from a number of sources, and the present invention can use any such smartcards. In addition, the present invention could utilize other types of portable storage/processing devices, including optical cards having internal secure processors. The exact structure of the smartcard is not critical, so long as the smartcard is capable of performing all necessary file signing operations that require access to the stored private key. It is possible, for example, to perform all digital signing operations on the smartcard itself, or to assign operations that do not require key access to the file signing tool 5.

In the preferred embodiment of the invention, the entity that prepares the smartcard 6 is certification authority/smartcard management system 4. While the certification authority/smartcard management system of the preferred embodiment of the invention is not to be limited to a particular hardware configuration, one possible configuration is a regular PC 7 running Windows NT, a smartcard DataCard reader/printer 5 that prints information on the cards and that loads the private keys and certificates into the smartcard, and a GCR410 smartcard reader used to validate the generated smartcard before sending it out. The private key may be generated by any private-public key generating algorithm, of which a number are well-known.

Also in the preferred embodiment of the invention, the signer certificate 9 associated with the private key 3 stored on the card may, by way of example and not limitation, comply with the IUT X509-V3 generic certificate standard, and in particular the PKIX-X509 profile. Since this is a publicly available standard well-known to those skilled in the art, further certificate definitions are not included herein, except to note that several private field extensions to the pre-defined version, serial number, algorithm identifier, issuer, validity period, key owner name, public key, and signature fields of the certificate may be added to define specific key properties. Especially advantageous are extensions that limit file types attached to the certificate, key width (which permits multiple keys to be loaded in the same field is the key is "narrow," for example in the case of sponsor certificates), and an identifier for a replacement certificate.

The customer file signing tool 5 may, like the certification authority/smartcard management system of the preferred embodiment, utilize any of a variety of possible configurations including, by way of example and not limitation, a regular PC 10 running Windows NT, and a GCR410 smartcard reader 11 that receives the smartcard and uses it to process files for downloading to the terminal 1. The principal function requirements of the file signing tool 5 are simply that it be capable of receiving a file or application, of supplying data necessary to the digital signing process to the smartcard reader for transfer to the smartcard, of receiving the digital signature 12 from the smartcard, and of supplying the digitally signed file to the terminal 1, preferably together with the signer certificate retrieved from the smartcard.

If the smartcard is to be protected by a PIN 13, then the file signing tool 5 must be capable of relaying a PIN that has been input by the signer to the smartcard for comparison with at least one PIN stored on the card by the certification authority 4. While it is possible to store multiple PINs on a smartcard, the preferred method of protecting the smartcard by multiple PINs is to store a single PIN and an authentication level on the card. The authentication level indicates the number of PINs that need to be entered through the file signing tool in order to access the card. Upon insertion of the card into a reader, the file signing tool reads the authentication level and prompts the user or users to input the multiple PINs. The multiple PINs are then combined in order to obtain a combined PIN for comparison with the PIN stored on the card. While different methods could be used for combining the input multiple PINs, a convenient way of combining the input PINs is to use a logical XOR (exclusive OR) operation.

The PINs to be input by the signer and compared with the PINs stored on the card are sent directly from the certification authority to the file signing entity for distribution to the person or persons that carry out the file signing. These PINs may be distributed to multiple individuals and correct entry of all PINs required to enable signing of a file, thus ensuring that a single individual cannot access the card without cooperation from all PIN holders, or the multiple PINs may be associated with multiple access levels. In the latter case, one PIN might be used to permit signing of certain non-critical types of files, while multiple PINs might be required to permit signing of critical file types.

When the authentication level that indicates the number of PINs is zero, the file signing tool does not request entry of any PINs, and a default PIN is presented to the card for comparison with a default PIN stored on the card. This setup is reserved for smartcards used during the development stage. Later on, the authentication level can be changed and a new PIN set up by using the file signing tool.

The third discrete element of the system shown in FIG. 1 is the terminal 2 capable of authenticating a downloaded file by decrypting the digital signature 12 with a corresponding public key 14 derived from the signer's public key certificate 9, and of authenticating the public key certificate 9 by means of an owner's or sponsor's certificate 15 that has previously been installed in the terminal, for example by the certification authority 4, and preferably by using appropriate authentication procedures.

As indicated above, the invention is not to be limited to a particular type of terminal 2. However, by way of example and not limitation, the terminal 2 may be a PINpad terminal of the type commonly used in retail establishments to read credit or debit cards, and to permit a customer to enter a PIN associated with the credit or debit card. An example of such a transaction terminal is a PINpad terminal core manufactured by VeriFone, Inc., a division of Hewlett Packard. The PINpad terminal core is connected to an external computing device that receives customer data from the PINpad, processes the data, and sends the results of the processing back to the PINpad to indicate whether the transaction is approved.

The VeriFone PINpad terminal core includes all of the hardware necessary to perform file authentication, including, for example, a single chip microcontroller with GPV3 functionality implemented as an on-chip hard-coded ROM and fixed-use RAM. In addition the microcontroller has sufficient input/output capabilities to drive a display, scan a keypad, support a magnetic card reader and primary interface, and a communications port for communicating with a main processor internal or external to the host platform. Additional support for authentication in the VeriFone terminal core may be provided by an optional transaction speed coprocessor arranged to provide RSA cryptography functions, and to communicate with the core processor by means of triple DES encoding or a similar data protection algorithm. The input/output features of the terminal core may be omitted when the core is used as a security module in the PINpad.

Such a terminal is capable of receiving a file downloaded from the file signing tool, and of authenticating the file by extracting the public key 14 from the signer certificate 9, decrypting the digital signature 12 using the public key 14, and comparing the values extracted from the decrypted digital signature with either (i) a reference value, (ii) values extracted from the signed file, and/or (iv) values extracted from the signer certificate, depending on the specific algorithms used to generate the digital signature, and on the specific authentication method used by the terminal, which may be pre-determined or selected based on information provided in the public key certificate.

If the signer certificate used to authenticate the file is downloaded to the terminal 2 together with the digitally signed file, then it is necessary for the terminal to authenticate the signer certificate. In the embodiment illustrated in FIG. 1, the signer certificate is signed by the certification authority 4 and authenticated by an owner or sponsor certificate 15 previously installed in the terminal.

Although not shown, the terminal may also include further certificates used to authenticate the one or more owner or sponsor certificates 15 during installation. The terminal 2 may include a single partition or multiple partitions which can be assigned to different sponsors, such as different banks and/or credit card companies, for storing application programs that control data communications, customer prompts, and so forth. Each of these partitions has a different owner's or sponsor's certificate for authenticating signer's certificates.

Although not required by the present invention, the partitions may advantageously be arranged in a hierarchy that permits different levels of authentication within a partition. Initially, the terminal is provided with a root platform certificate in a secure root directory. The root certificate is used to authenticate an operating system partition certificate and an application partition certificate that permit operating software loaded by the manufacturer or that authenticates the operating system owner certificate of another party such as the key management authority to be authenticated so that the other party can load operating system software, and that permits the key management authority to authenticate owner certificates for the application areas of the terminal.

In addition to securing the terminal against unauthorized access through file transfers, the terminal should of course be physically secured, for example by arranging the terminal to erase information if an attempt is made to pry open the case without proper authentication, or that renders the terminal inoperative upon repeated such attempts. Similar protection against physical tampering may also be provided for the smartcard or secure processing unit. Such tamper prevention arrangements are well-known and are not part of the present invention.

Figure 2:
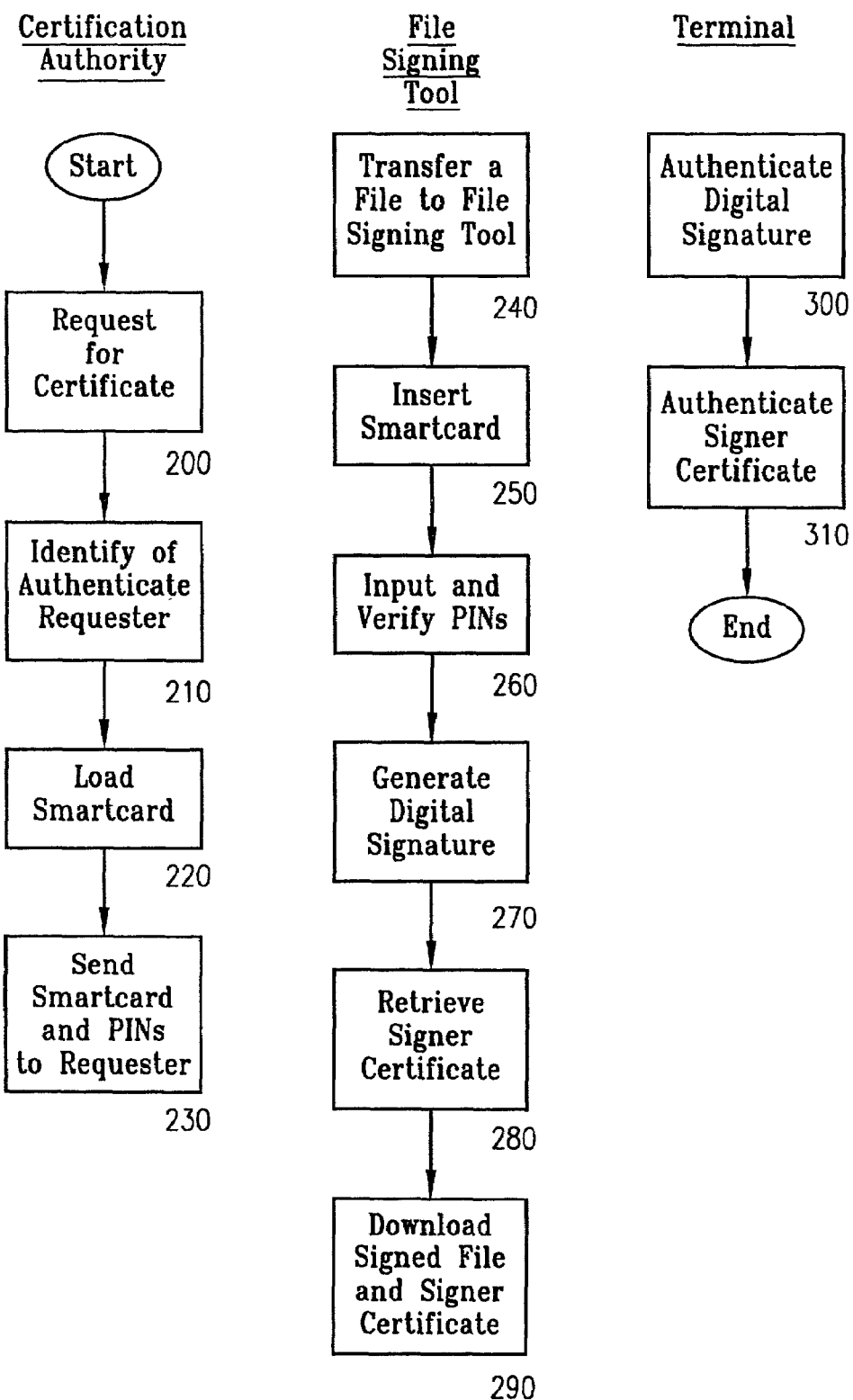
FIG. 2 is a flowchart of a key management and file authentication method according to the preferred embodiment of the invention.

Turning to FIG. 2, the method of the invention involves three principal subroutines or sub-methods carried out, respectively, by certification authority 4, file signing tool 5, and terminal 2: certification, signing, and authentication.

The certification subroutine begins when a request for a sponsor certificate is received by the certification authority (step 200). The certification authority then collects data concerning the identity of the requester for the purpose of creating the certificate or, if the requester is an existing customer, authenticates the requester (step 210) by asking the requester to the use the file signing tool and an existing signer certificate to sign a file supplied by the certification authority, thus enabling the certification authority to verify that the requester is entitled to new signer or clear certificates for a particular sponsor certificate. The order is then confirmed by the requester, signer certificates for the previously generated sponsor certificate are generated, and the signer certificates, private key(s), PIN(s), and an authentication level are loaded onto a smartcard (step 220). Finally, the smartcard is sent to the requester (step 230), as is a separate communication containing the PIN(s) necessary to use the smartcard.

When the sponsor wishes to load a file into a terminal, the file is transferred to the file signing tool, (step 240), the smartcard is inserted into the card reader of the file signing tool (step 250), the file signing tool reads the authentication level, requests the indicated number of PINs, and all necessary PINs are input (step 260). If the authentication level is greater than one, i.e., if more than one PIN is required, the file signing tool combines the PINs by, for example, XORing the input PINs to obtain a combined PIN to be compared with a PIN stored on the card and, if the set of entered PINs is complete and correct, the file signing tool generates a digital signature (step 270), retrieves the signer certificate (step 280), and then downloads the digitally signed file together with the signer certificate to the terminal (step 290).

Upon receipt of the digitally signed file, the terminal authenticates the file by decrypting the digital signature and verifying that the resulting plain-text information or values correspond to those included in the signer certificate (step 300). The terminal then authenticates the signer certificate by referring to a sponsor certificate previously stored or loaded into the terminal (step 310), completing the authentication process. Alternatively, the digital signature may be downloaded subsequent to loading of the file, with execution of the file being delayed until a proper digital signature is received.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

We claim:

1. A system for protecting keys used to digitally sign files to be downloaded to a terminal, comprising:
    a smartcard having stored thereon a private key; and
    a file signing tool arranged to receive a file to be signed, to access the smartcard, and to download the file to the terminal,
    wherein the smartcard includes an embedded secure processor programmed to perform all digital signing operations that require access to the private key before supplying results of the operations to the file signing tool, the file signing tool then performing further processing as necessary to generate a digital signature that is appended to the file for download to the terminal,
    wherein said smartcard has stored thereon an authentication level indicating a number of PINs that must be input in order to access the smartcard.

2. A system as claimed in claim 1, wherein the smartcard also has stored thereon a signer certificate containing a public key corresponding to said private key.

3. A system as claimed in claim 2, wherein said file signer tool is arranged to retrieve said signer certificate from said smartcard and append the signer certificate to the signed file for use by the terminal in authenticating a digital signature generated by the smartcard and file signing tool.

4. A system as claimed in claim 3, wherein the signer certificate includes a field designating file types that may be authenticated by the signer certificate.

5. A system as claimed in claim 3, further comprising an owner certificate installed on said terminal for use by the terminal in authenticating the signer certificate.

6. A system as claimed in claim 1, wherein the smartcard also has stored thereon a PIN, and wherein said smartcard is arranged to perform digital signing operations only if a corresponding PIN is input through said file signing tool.

7. A system as claimed in claim 1, wherein said PINs that must be input are combined by a logical exclusive OR operation in order to obtain a combined PIN to be compared with a PIN stored on the smartcard before said digital signing operations are performed.

8. A system as claimed in claim 1, wherein different ones of said PINs permit access to different private keys and public keys certificates having different file type properties, thereby enabling different authorization levels to be established.

9. A system for protecting keys used to digitally sign files to be downloaded to a terminal, comprising:
    a smartcard; and
    means for storing a key on the smartcard and means for protecting the key by requiring input of multiple PINs before the smartcard can be accessed,
    wherein the smartcard includes an embedded secure processor programmed to perform digital signing operations that require access to the key,
    wherein said PINs that must be input are combined in order to obtain a combined PIN to be compared with a PIN stored on the smartcard before said digital signing operations are performed.

10. A system as claimed in claim 9, wherein said PINs that must be input are combined by a logical exclusive OR operation in order to obtain said combined PIN.

11. A system as claimed in claim 9, wherein different ones of said PINs permit access to different private keys and public keys certificates having different file type properties, thereby enabling different authorization levels to be established.

12. A method of protecting keys used to digitally sign files to be downloaded to a terminal, comprising the steps of:
    providing a smartcard having stored thereon a private key;
    providing a file signing tool arranged to receive a file to be signed, to access the smartcard, and to download the file to the terminal;
    storing at least one PIN on the smartcard;
    storing an authentication level on the smartcard, said authentication level indicating a number of PINs that must be input to the file signing tool in order to enable said file signing tool to access the smartcard;
    reading the authentication level and prompting at least one user to input said PINs to the file signing tool;
    combining said PINs to obtain a combined PIN;
    comparing said combined PIN with said at least one PIN stored on the smartcard; and
    if said combined PIN corresponds to said at least one PIN stored on the smartcard, utilizing a secure processor embedded in the smartcard to perform all digital signing operations that require access to the private key before supplying results of the operations to the file signing tool, the file signing tool then performing further processing as necessary to generate a digital signature that is appended to the file for download to the terminal.

13. A method as claimed in claim 12, comprising the step of storing on said smartcard a plurality of said PINs in order to permit access to different private keys and public key certificates having different file type properties, thereby enabling different authorization levels to be established.

* * * * *